(12) United States Patent
Horinouchi et al.

(10) Patent No.: US 8,064,313 B2
(45) Date of Patent: Nov. 22, 2011

(54) OPTICAL DISK, RECORDING/REPRODUCING METHOD THEREOF, AND OPTICAL DISK APPARATUS WITH EMPLOYMENT OF OPTICAL DISK

(75) Inventors: Syougo Horinouchi, Fukuoka (JP); Taiichi Mori, Fukuoka (JP); Hideaki Horio, Fukuoka (JP); Shohei Inoue, Fukuoka (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 12/580,083

(22) Filed: Oct. 15, 2009

(65) Prior Publication Data
US 2010/0097916 A1 Apr. 22, 2010

(30) Foreign Application Priority Data
Oct. 15, 2008 (JP) ................................. 2008-266002

(51) Int. Cl.
*G11B 7/00* (2006.01)
(52) U.S. Cl. ....................................................... 369/103
(58) Field of Classification Search .................. None
See application file for complete search history.

(56) References Cited

U.S. PATENT DOCUMENTS

| 7,388,695 | B2 | 6/2008 | Lawrence et al. | |
|---|---|---|---|---|
| 2006/0280095 | A1* | 12/2006 | Tsukagoshi et al. | 369/103 |
| 2008/0267039 | A1* | 10/2008 | Horinouchi et al. | 369/103 |

* cited by examiner

*Primary Examiner* — Christopher Lamb
(74) *Attorney, Agent, or Firm* — Dickinson Wright PLLC

(57) ABSTRACT

Then, in order to achieve the above-described object, in the optical disk of the present invention, while micro-hologram layers 7 and 8 made of plural layers are provided in an inner portion of a plate body 2 along a thickness direction of the plate body 2, dimensions of micro-holograms 4 along the thickness direction of the plate body 2, which configure the micro-hologram layer 7 formed on the side of one surface of the plate body 2 within the micro-hologram layers 7 and 8 constructed of the plural layers, are made smaller than dimensions of micro-holograms 3 along the thickness direction of the plate body 2, which configure a micro-hologram layer 8 formed on the side of an inner layer of the plate body 2.

12 Claims, 7 Drawing Sheets

OPTICAL DISK, RECORDING/REPRODUCING METHOD THEREOF, AND OPTICAL DISK APPARATUS WITH EMPLOYMENT OF OPTICAL DISK

BACKGROUND

1. Field of the Invention

The present invention relates to an optical disk, a recording/reproducing method of the optical disk, and an optical disk apparatus with employment of the optical disk.

2. Description of the Related Art

Very recently, various sorts of technical ideas capable of recording on recording media in a multi-layer manner have been proposed in order to increase recording capacities of the recording media.

In other words, in the recording media, micro-hologram layers constructed of plural layers are formed in inner portions of plate bodies along thickness directions of the plate bodies. Since the micro-hologram layers are made in the multi-layer structures, recording capacities of the recording media become extremely large (refer to, for instance, below-mentioned publication 1).

Patent Publication 1: U.S. Pat. No. 7,388,695

In the above-described conventional techniques, an NA (numerical aperture) of a lens employed so as to form the micro-hologram layers made of the plural layers in the inner portions of the plate bodies is made small in order that light may reach the inner portions of the plate bodies.

Then, while this lens is employed, micro-holograms having the same dimensions are formed in a micro-hologram layer provided on the side of a plate body, and furthermore, in another micro-hologram layer provided on the side of an inner layer of this plate body.

However, as previously explained, as to the micro-holograms formed in the respective micro-hologram layers by employing the lens having such a small NA, dimensions of these micro-holograms along a thickness direction of the plate body become longer. As a result, a large number of the above-described micro-hologram layers cannot be formed within the plate body, which may impede that recording capacities thereof are increased.

SUMMARY

Under such a circumstance, the present invention has an object capable of achieving an increase of a recording capacity.

Thus, in order to achieve the above-described object, the present invention provides with a optical disk comprising a plate body, and a plurality of micro-hologram layers formed in an inner portion of the plate body along a thickness direction of the plate body, wherein dimensions along the thickness direction of the plate body of micro-holograms which configure a micro-hologram layer formed on a side of one surface of the plate body among the plurality of micro-hologram layers, are made smaller than dimensions along the thickness direction of the plate body of micro-holograms which configure a micro-hologram layer formed on a side of an inner layer of the plate body.

As previously described, in accordance with the present invention, while the micro-hologram layers constructed by employing the plurality of layers are formed in the inner portion of the plate body along the thickness direction of the above-described plate body, the dimensions of the micro-holograms along the thickness direction of the plate body, which configure one micro-hologram layer formed on the side of one surface of the plate body within the micro-hologram layers constructed of the plural layers, are made smaller than the dimensions of the micro-holograms along the thickness direction of the plate body, which configure another micro-hologram layer formed on the side of an inner layer of the plate body. As a result, a recording capacity thereof can be increased.

In other words, in the present invention, the dimensions of the micro-holograms along the thickness direction of the plate body, which configure one micro-hologram layer formed on the side of one surface of the plate body within the micro-hologram layers constructed of the plural layers, are made smaller than the dimensions of the micro-holograms along the thickness direction of the plate body, which configure another micro-hologram layer formed on the side of an inner layer of the plate body. As a consequence, a larger number of the micro-hologram layers can be formed along the thickness direction of the plate body. As a result, the recording capacity thereof can be increased.

DETAILED DESCRIPTION

Referring now to the accompanying drawings, a description is made of an embodiment mode of the present invention.

Figure 1:
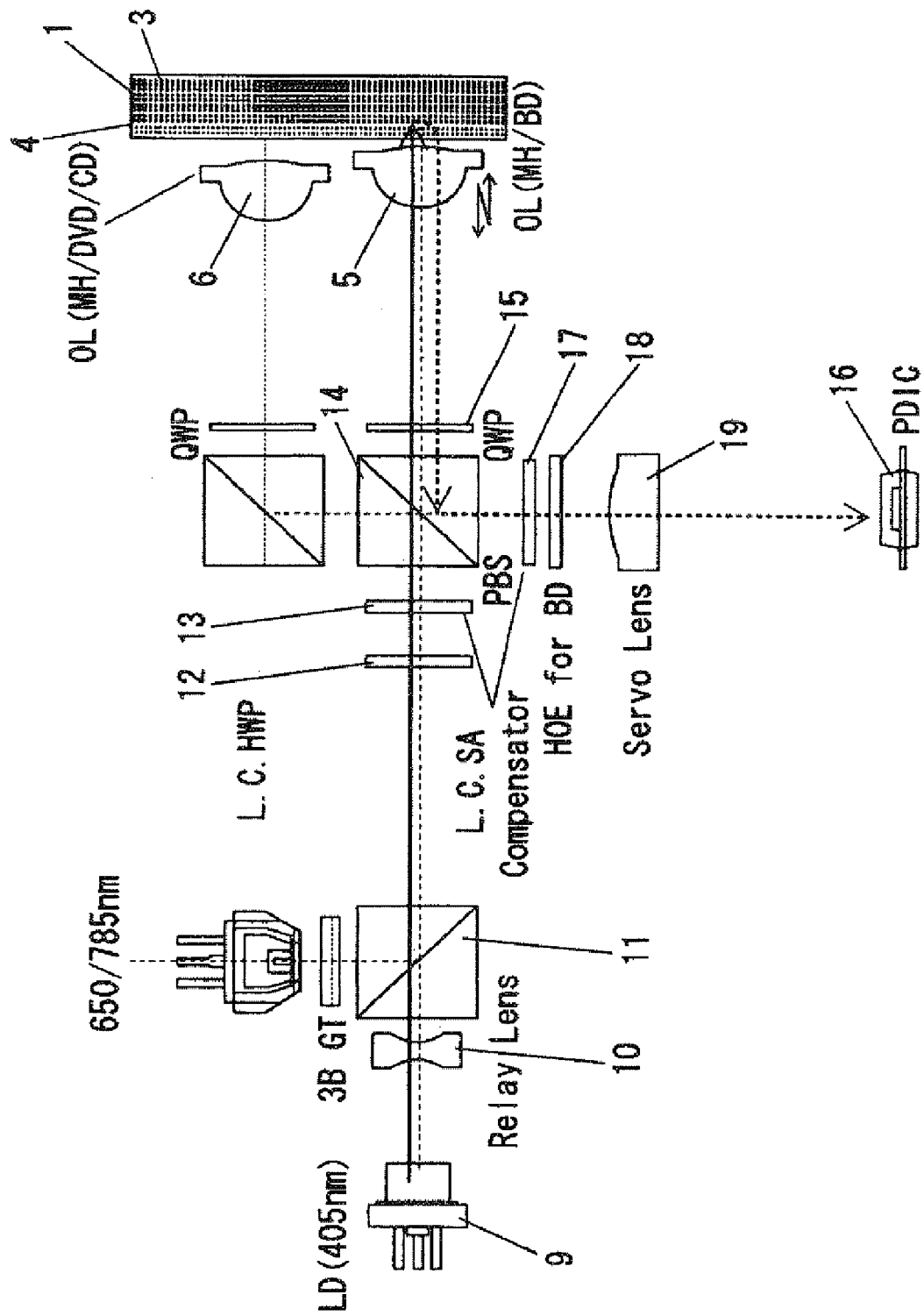
FIG. 1 is a block diagram for showing an embodiment mode of the present invention.

FIG. 1 indicates an optical disk apparatus capable of recording/reproducing a micro-hologram disk (MH), a CD, a DVD, and a BD as recording media.

Firstly, a description is made of recording/reproducing operations by the optical disk apparatus in such a case that a micro-hologram disk (MN) 1 is employed as a optical disk.

The micro-hologram (MH) 1 shown in FIG. 1 is configured of a disk-shaped plate body 2. Although not shown in FIG. 1, a driving shaft is inserted to a through hole formed in a center portion of the disk-shaped plate body 2, so that the micro-hologram disk (MH) 1 is driven in a rotation manner by the driving shaft.

Figure 2:
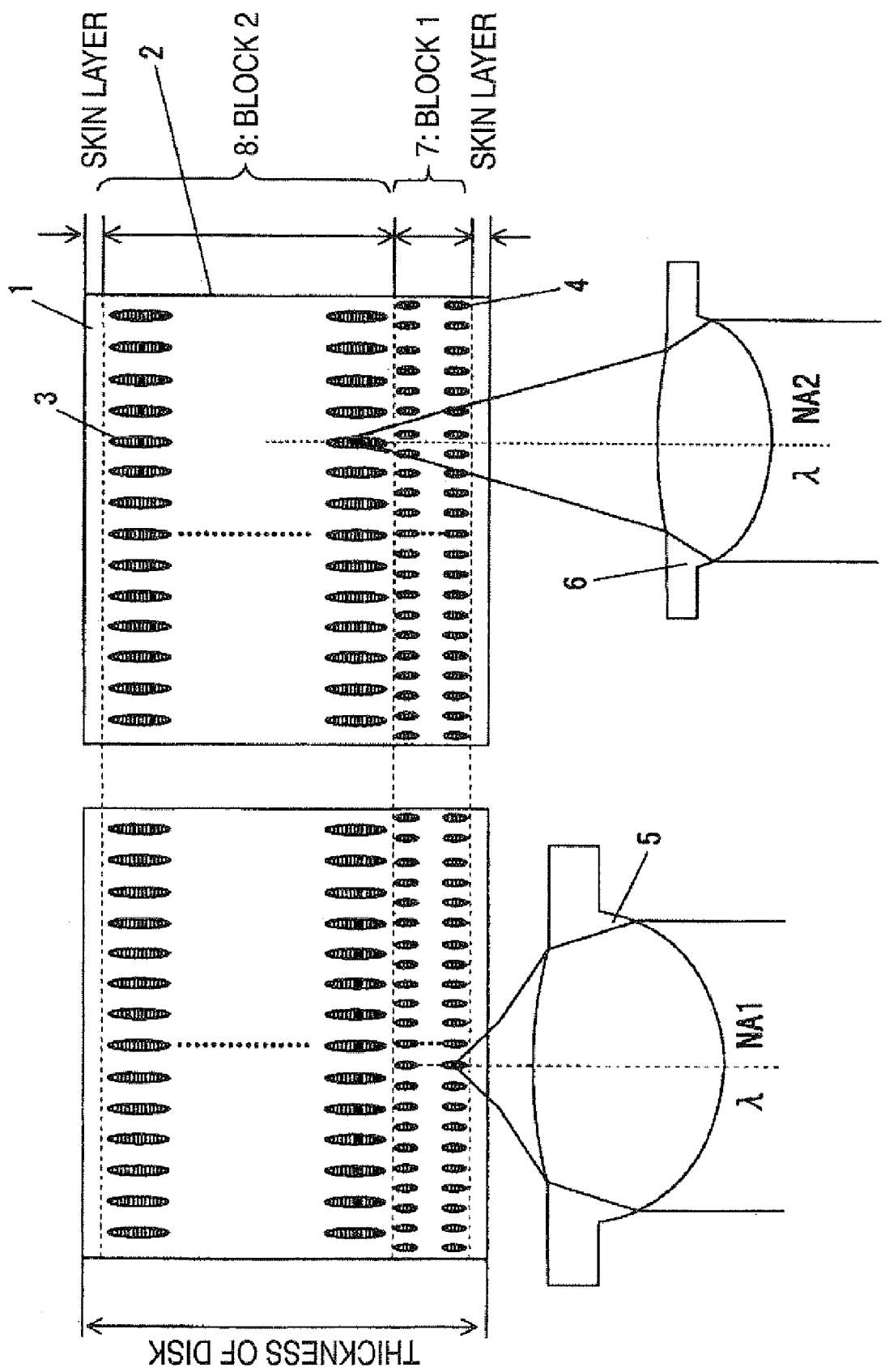
FIG. 2 is a block diagram for showing an embodiment mode of the present invention.

As represented in FIG. 2, the micro-hologram disk (MH) 1 employed in the present embodiment mode is such a disk that micro-holograms 3 and 4 are previously formed inside the plate body 2. In other words, as to the micro-hologram disk (MH) 1, the micro-holograms 3 and 4 are previously formed in the internal portion of the plate body 2 by utilizing the technique of the above-described patent publication 1. When the micro-hologram disk (MH) 1 is recorded, light is irradiated to the micro-holograms 3 and 4 so as to cause an optical alteration, and the micro-holograms 3 and 4 to which light is not irradiated are brought into such a situation that original situations thereof are held. As a result, the micro-hologram disk (MH) 1 can perform a so-called "digital recording operation" of "1" and "0."

Then, when the micro-hologram disk (MH) 1 is reproduced, the above-described digital signals of "1" and "0" formed based upon such a situation whether or not the micro-holograms 3 and 4 are optically altered can be obtained. As a result, the micro-hologram disk (MH) 1 can perform a digital reproducing operation.

As to a feature point in the present embodiment mode, as represented in FIG. 2, the micro-hologram disk (MH) 1 has a micro-hologram layer 7 provided on the side of one surface of the plate body 2 (on the side of lenses 5 and 6 of FIG. 1, namely, on the side of recording plane), and another micro-hologram layer 8 provided from an inner layer of the plate body 2 to the other surface side thereof. In other words, the micro-hologram disk (MH) 1 has the micro-hologram layer 7 constructed of the micro-holograms 4, and the micro-hologram layer 8 constructed of the micro-holograms 3.

Concretely speaking, as to the micro-hologram layer 7, 23 layers are present, whereas as to the micro-hologram layer 8, 30 layers are present.

Also, as shown in FIG. 2, dimensions as to the micro-holograms 4 which construct the micro-hologram layer 7 along a thickness direction of the plate body 2 are made smaller than dimensions as to the micro-holograms 3 which construct the micro-hologram layer 8 (for instance, micro-holograms 4: micro-holograms 3=1:3).

Moreover, as to dimensions along a direction perpendicular to the thickness direction of the plate body 2, the dimensions of the micro-holograms 4 which construct the micro-hologram layer 7 are made smaller than those of the micro-holograms 3 which construct the micro-hologram layer 8 (for instance, micro-holograms 4: micro-holograms 3=1:1.5).

As a consequence, a recording capacity of the above-described micro-hologram disk (MH) 1 equipped with the plate body 2 having such a structure that all of the micro-hologram layers (namely, layer portion 7 and layer portion 8) are configured by the micro-holograms 3 and 4 can be increased two, or more times larger than a recording capacity of such a micro-hologram disk equipped with the plate body 2 that all of the micro-hologram layers 7 and 8 are configured by the micro-holograms 3.

In other words, even if only the dimensions of the micro-holograms 4 which configure the micro-hologram layer 7 along the thickness direction of the plate body 2 are made smaller than those of the micro-holograms 3 which configure the micro-hologram layer 8 (for instance, micro-holograms 4: micro-holograms 3=1:3), then the resultant recording capacity of the micro-hologram disk 1 can be increased two, or more times larger than that constructed of only the micro-holograms 3. However, if the dimensions of the micro-holograms 4 which configure the micro-hologram layer 7 along the direction perpendicular to the thickness direction of the plate body 2 are also made smaller than those of the micro-holograms 3 which configure the micro-hologram layer 8 (for example, micro-holograms 4: micro-holograms 3=1:1.5), then the resultant recording capacity of the micro-hologram disk 1 can be furthermore increased.

Also, the micro-holograms 4 and the micro-holograms 3 can be formed at the same time by increasing NAs of lenses in such a case that the dimensions of the micro-holograms 4 which configure the micro-hologram layer 7 along the thickness direction of the plate body 2 are made smaller than those of the micro-holograms 3 which configure the micro-hologram layer 8 (for instance, micro-holograms 4: micro-holograms 3=1:3), and furthermore, the dimensions of the micro-holograms 4 which configure the micro-hologram layer 7 along the direction perpendicular to the thickness direction of the plate body 2 are also made smaller than those of the micro-holograms 3 which configure the micro-hologram layer 8 (for example, micro-holograms 4: micro-holograms 3=1:1.5).

It should also be noted that in the present embodiment mode, a thickness ratio of the micro-hologram layer 7 with respect to the micro-hologram layer 8 is nearly equal to, micro-hologram layer 7: micro-hologram layer 8=1:4.

Now, a brief description is made of forming of the above-described micro-hologram disk (MH) 1.

Firstly, as can also be understood from FIG. 2, since the micro-holograms 3 which construct the micro-hologram layer 8 are required to be similarly formed in the inner layer of the plate body 2, lenses used to form these micro-holograms 3 are arranged on both planes of a master hologram disk (not shown), the NAs of which are small.

In contrast to the above-described micro-holograms 3, as can also be understood from FIG. 2, since the micro-holograms 4 which construct the micro-hologram layer 7 may be merely formed only on the side of one surface of the plate body 2, lenses used to form these micro-holograms 4 are arranged on both sides of the master hologram disk (not shown), the NAs of which are large. It should also be noted that as to a lens (not shown) positioned opposite to the lens 5, such a lens is required whose diameter is extremely large even if the NA of this lens is equal to the NA of the lens 5.

Then, a conjugate hologram disk (not shown) was formed from the master hologram disk manufactured in the above-described manner, and the above-explained micro-hologram disk (MH) 1 is formed by utilizing this conjugate hologram disk.

As previously described, in such a case that the master hologram disk is formed, as to the lens positioned opposite to the lens 5, such a lens is required whose diameter is extremely large even if the NA of this lens is equal to the NA of the lens 5. However, it should be understood that such a lens having the extremely large diameter is required in a manufacturing factory (not shown) of the master hologram disk and the micro-hologram disk (MH) 1 in an optical disk apparatus for performing recording and reproducing operations with employment of the micro-hologram (MH) 1 where the micro-hologram layers 7 and 8 are formed (as represented in FIG. 2), the optical disk apparatus can be arranged by employing only two pieces of the lens 6 and the lens 5 whose NA is larger than the NA of the lens 6, the optical disk apparatus is not made bulky.

In the present embodiment mode, the structure shown in FIG. 1 is employed in order to perform recording and reproducing operations with employment of the micro-hologram disk (MH) 1 represented in FIG. 2.

Firstly, a description is made of recording and reproducing operations with respect to the micro-hologram layer 7 formed on the side of one surface of the plate body 2 with reference to FIG. 1 and FIG. 2.

Blue laser light emitted from a laser diode 9 passes through a relay lens 10 which collimates the laser light, so as to produce collimated laser light, a beam splitter 11, a liquid crystal type ½(half)-wavelength plate 12, a spherical aberration correcting element 13, another beam splitter 14, and a ¼(quarter)-wavelength plate 15, and then, the passed laser light is irradiated via the lens 5 to a target micro-hologram 4 of the micro-hologram layer 7.

At this time, since the recording operation is carried out, while intensity of the laser light to be irradiated to the micro-holograms 4 is increased (namely, intensity of laser light during recording operation is approximately 10 times higher than that of reading operation), the micro-hologram 4 to which the laser light is irradiated causes an optical alteration, whereas the micro-hologram 4 to which the laser light is not irradiated does not cause an optical alteration. In other words, a digital recording operation based upon so-called "digital signals" of "1" and "0" is carried out by the above-described optical alterations.

It should also be noted that although the beam splitter 11 may pass therethrough the blue laser light, the beam splitter 11 may not pass therethrough red laser light and infrared laser light.

Also, the polarization direction of the liquid crystal type ½-wavelength plate 12 may be changed by applying thereto voltages. In the case of FIG. 1, the liquid crystal type ½-wavelength plate 12 is under OFF state.

Further, the beam splitter 14 passes therethrough P-polarized light, and reflects thereon S-polarized light.

Next, a description is made of a signal reproducing operation as to the micro-hologram layer 7.

A broken line of FIG. 1 indicates situations when the signal reproducing operation is carried out. At this time, since the intensity of the laser light to be irradiated to the micro-holograms 4 is decreased (namely, intensity of laser light during reproducing operation is equal to approximately ⅒ intensity of laser light during recording operation), the micro-holograms 4 of the micro-hologram layer 7 do not cause optical alteration, but reflection waves reflected from the micro-holograms 4 are continuously received by a light receiving element 16 so as to acquire a reproduction signal.

Since the reflection waves reflected from the micro-holograms 4 once pass through the ¼-wavelength plate 15 before the reflection waves reach the lens 5, the reflection waves again pass through the ¼-wavelength plate 15 as the reflection waves, so that the P-polarized light thereof becomes S-polarized light. As a result, the S-polarized light is reflected on the beam splitter 14, and thereafter, the reflected S-polarized light passes through another spherical aberration correcting element 17, a BD tracking-purpose element 18, and a focal point adjusting lens 19, and then, reaches the light receiving element 16 in the above-explained manner.

Figure 3:
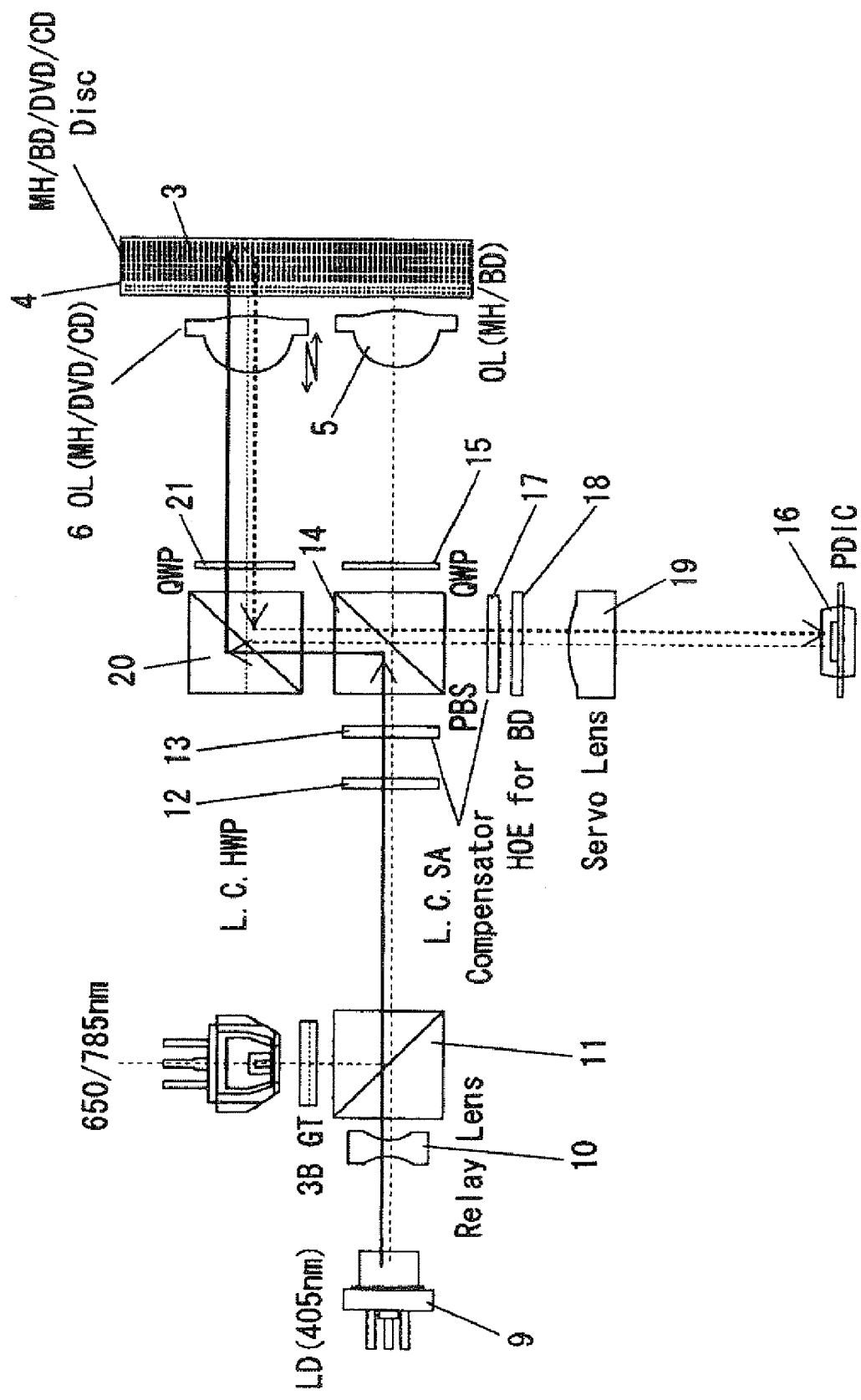
FIG. 3 is a block diagram for showing an embodiment mode of the present invention.

Next, FIG. 3 shows recording and reproducing operations with respect to the micro-hologram layer 8 formed from the inner layer to the other surface side of the plate body 2, namely, with respect to the micro-hologram layer 8 constructed of the micro-holograms 3.

In this case, since the voltage is applied to the liquid crystal type ½-wavelength plate 12, the blue laser light emitted from the laser diode 9 is polarized so as to obtain S-polarized light, and then, the S-polarized blue laser light is reflected on the beam splitter 14.

The blue laser light reflected from the beam splitter 14 is reflected on a beam splitter 20 which reflects thereon all of laser light, and then, the reflected blue laser light passes through a ¼(quarter)-wavelength plate 21, and thereafter, is irradiated via the lens 6 to a target micro-hologram 3 of the hologram layer 8 (since NA of lens 6 is smaller than NA of lens 5, reflected laser light may reach inner portion of micro-hologram layer 8).

At this time, since the recording operation is carried out, while the intensity of the laser light to be irradiated to the micro-hologram 3 is increased (namely, intensity of laser light during recording operation is approximately 10 times higher than that of reading operation), the micro-hologram 3 to which the laser light is irradiated causes an optical alteration, whereas the micro-hologram 3 to which the laser light is not irradiated does not cause an optical alteration. In other words, a digital recording operation based upon so-called "digital signals" of "1" and "0" is carried out by the above-described optical alterations.

Next, a description is made of a reproducing operation with respect to the micro-hologram layer 8.

A broken line of FIG. 3 indicates situations when a signal reproducing operation is carried out. At this time, since the intensity of the laser light to be irradiated to the micro-holograms 3 is decreased (namely, intensity of laser light during reproducing operation is equal to approximately ⅒ intensity of laser light during recording operation), the micro-holograms 3 of the micro-hologram layer 8 do not cause optical alteration, but reflection waves reflected from the micro-holograms 3 are continuously received by the light receiving element 16 so as to acquire a reproduction signal.

Since the reflection waves reflected from the micro-holograms 3 once pass through the ¼-wavelength plate 21 before the reflection waves reach the lens 6, the reflection waves again pass through the ¼-wavelength plate 21 as the reflection waves, so that the S-polarized light thereof becomes P-polarized light. As a result, the P-polarized light is reflected on the beam splitter 20, and thereafter, the reflected P-polarized light passes through the beam splitter 14. Next, the passed P-polarized light passes through the spherical aberration correcting element 17, the BD tracking-purpose element 18, and the focal point adjusting lens 19, and then, reaches the light receiving element 16 in the above-explained manner. It should also be understood that the beam splitter 20 may be alternatively substituted by a mirror.

Figure 4:
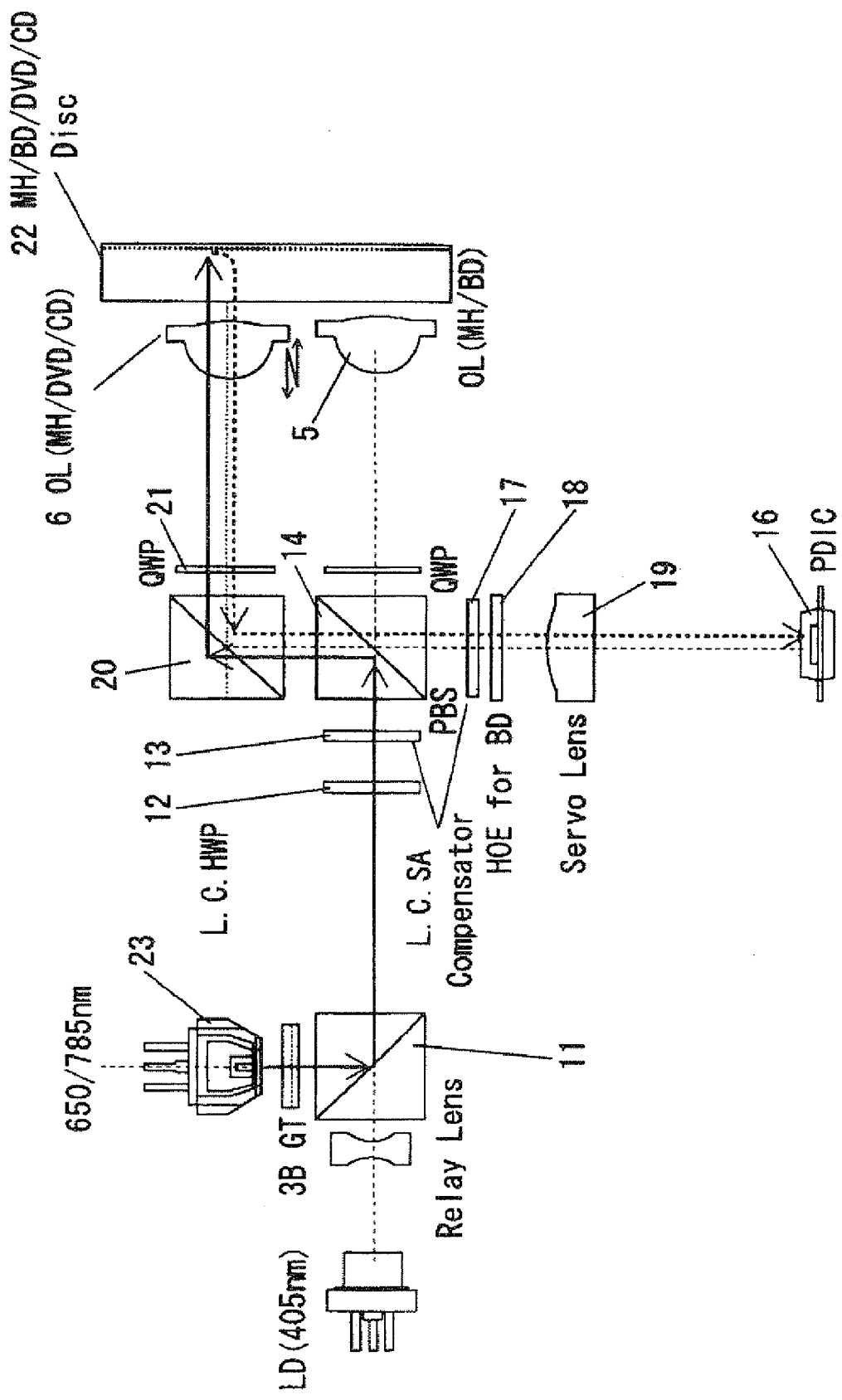
FIG. 4 is a block diagram for showing an embodiment mode of the present invention.

FIG. 4 represents such a condition that the lens 6 is utilized as a lens capable of recording and reproducing signals on/from a CD 22.

In other words, in the CD 22, signals are recorded on a plane of the CD 22 that is separated apart from the lens 6, or the signals are read out from this plane. As a result, the lens 6 having the small NA may be utilized.

In this case, infrared laser light is emitted from a laser diode 23, the emitted infrared laser light is reflected on the beam splitter 11, and then, is polarized to become S-polarized light by applying the voltage to the liquid crystal type ½-wavelength plate 12, and thereafter, the S-polarized light is reflected on the beam splitter 14.

The infrared laser light reflected from the beam splitter 14 is reflected on the beam splitter 20 which reflects thereon all of laser light, and then, the reflected infrared laser light passes through the ¼(quarter)-wavelength plate 21, and thereafter, is irradiated via the lens 6 to a target portion of the CD 22 (since NA of lens 6 is smaller than NA of lens 5, reflected infrared laser light may reach inner portion of CD 22).

At this time, since a recording operation of the CD 22 is carried out, the intensity of the infrared laser light to be irradiated to the CD 22 is increased, as compared with that when a reading operation is carried out. As a result, a recording operation with respect to the laser-irradiated CD 22 can be carried out.

Next, a description is made of a reproducing operation with respect to the CD 22.

A broken line of FIG. 4 shows situations when a signal reproducing operation is carried out. At this time, since the intensity of the infrared laser light to be irradiated to the CD 22 is decreased, as compared with that when the signal recording operation is carried out, reflection waves reflected from the CD 22 are continuously received by the light receiving element 16 so as to acquire a reproduction signal.

Since the reflection waves reflected from the CD 22 once pass through the ¼-wavelength plate 21 before the reflection waves reach the lens 6, the reflection waves again pass through the ¼-wavelength plate 21 as the reflection waves, so that the S-polarized light thereof becomes P-polarized light. As a result, the P-polarized light is reflected on the beam splitter 20, and thereafter, the reflected P-polarized light passes through the beam splitter 14. Next, the passed P-polarized light passes through the spherical aberration correcting element 17, the BD tracking-purpose element 18, and the focal point adjusting lens 19, and then, reaches the light receiving element 16 in the above-explained manner.

Figure 5:
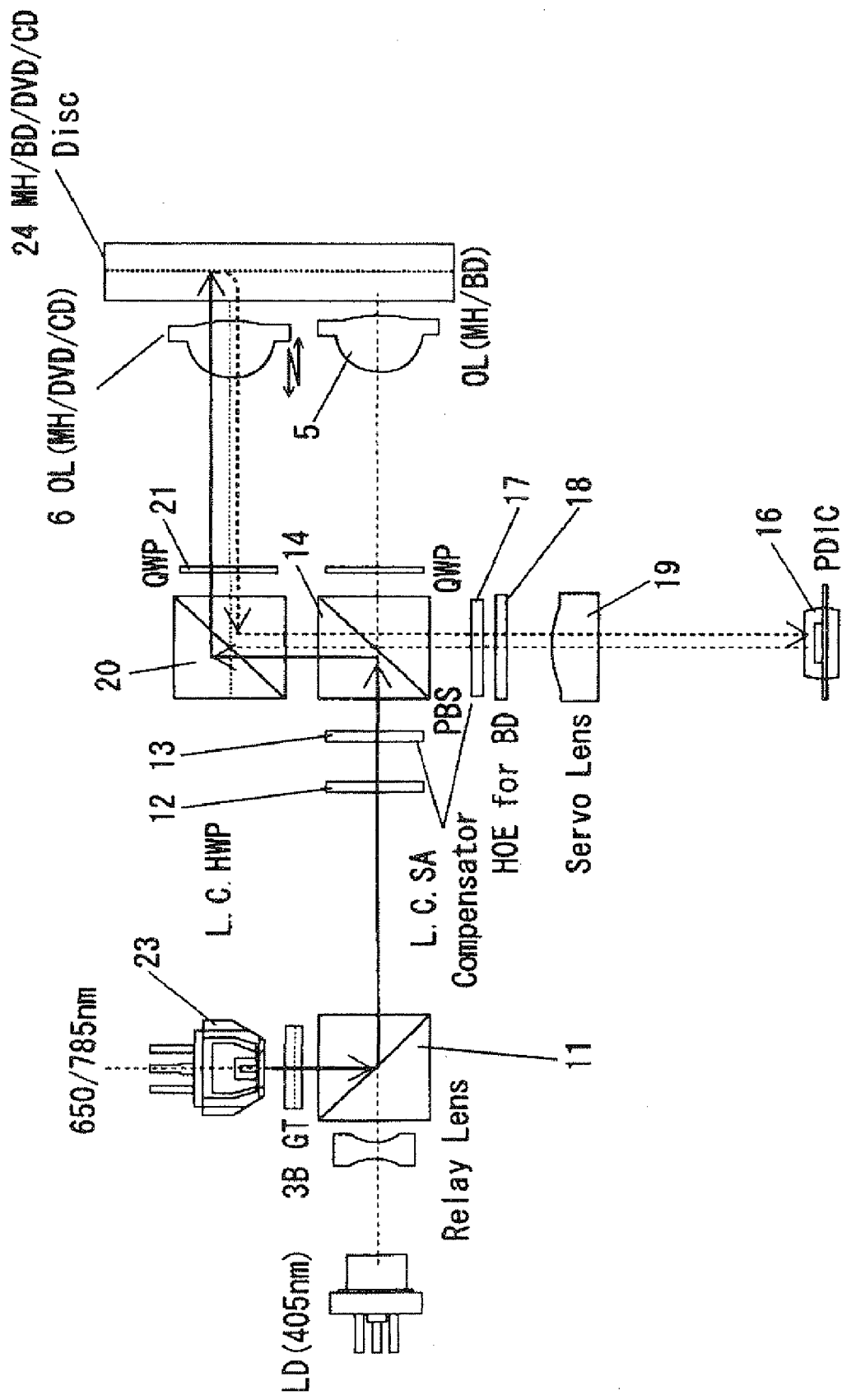
FIG. 5 is a block diagram for showing an embodiment mode of the present invention.

FIG. 5 indicates such a condition that the lens 6 is utilized as a lens capable of recording and reproducing a DVD 24.

In other words, in the DVD 24, signals are recorded on a plane (center portion) of the DVD 24 that is separated from the lens 6, or the signals are read out from this plane. As a result, the lens 6 having the small NA may be utilized.

In this case, infrared laser light is emitted from the laser diode 23, the emitted infrared laser light is reflected on the beam splitter 11, and then, is polarized to become S-polarized light by applying the voltage to the liquid crystal type ½-wavelength plate 12, and thereafter, the S-polarized light is reflected on the beam splitter 14.

The infrared laser light reflected from the beam splitter 14 is reflected on the beam splitter 20 which reflects thereon all of laser light, and then, the reflected infrared laser light passes through the ¼(quarter)-wavelength plate 21, and thereafter, is irradiated via the lens 5 to a target portion of the DVD 24 (since NA of lens 6 is smaller than NA of lens 5, reflected infrared laser light may reach inner portion of DVD 24).

At this time, since a recording operation of the DVD 24 is carried out, the intensity of the infrared laser light to be irradiated to the DVD 24 is increased, as compared with that when a reading operation is carried out. As a result, a recording operation with respect to the laser-irradiated DVD 24 can be carried out.

Next, a description is made of a reproducing operation with respect to the DVD 24.

A broken line of FIG. 5 shows situations when a signal reproducing operation is carried out. At this time, since the intensity of the infrared laser light to be irradiated to the DVD 24 is decreased, as compared with that when the signal recording operation is carried out, reflection waves reflected from the DVD 24 are continuously received by the light receiving element 16 so as to acquire a reproduction signal.

Since the reflection waves reflected from the DVD 24 once pass through the ¼-wavelength plate 21 before the reflection waves reach the lens 6, the reflection waves again pass through the ¼-wavelength plate 21 as the reflection waves, so that the S-polarized light thereof becomes P-polarized light. As a result, the P-polarized light is reflected on the beam splitter 20, and thereafter, the reflected P-polarized light passes through the beam splitter 14. Next, the passed P-polarized light passes through the spherical aberration correcting element 17, the BD tracking-purpose element 18, and the focal point adjusting lens 19, and then, reaches the light receiving element 16 in the above-explained manner.

Figure 6:
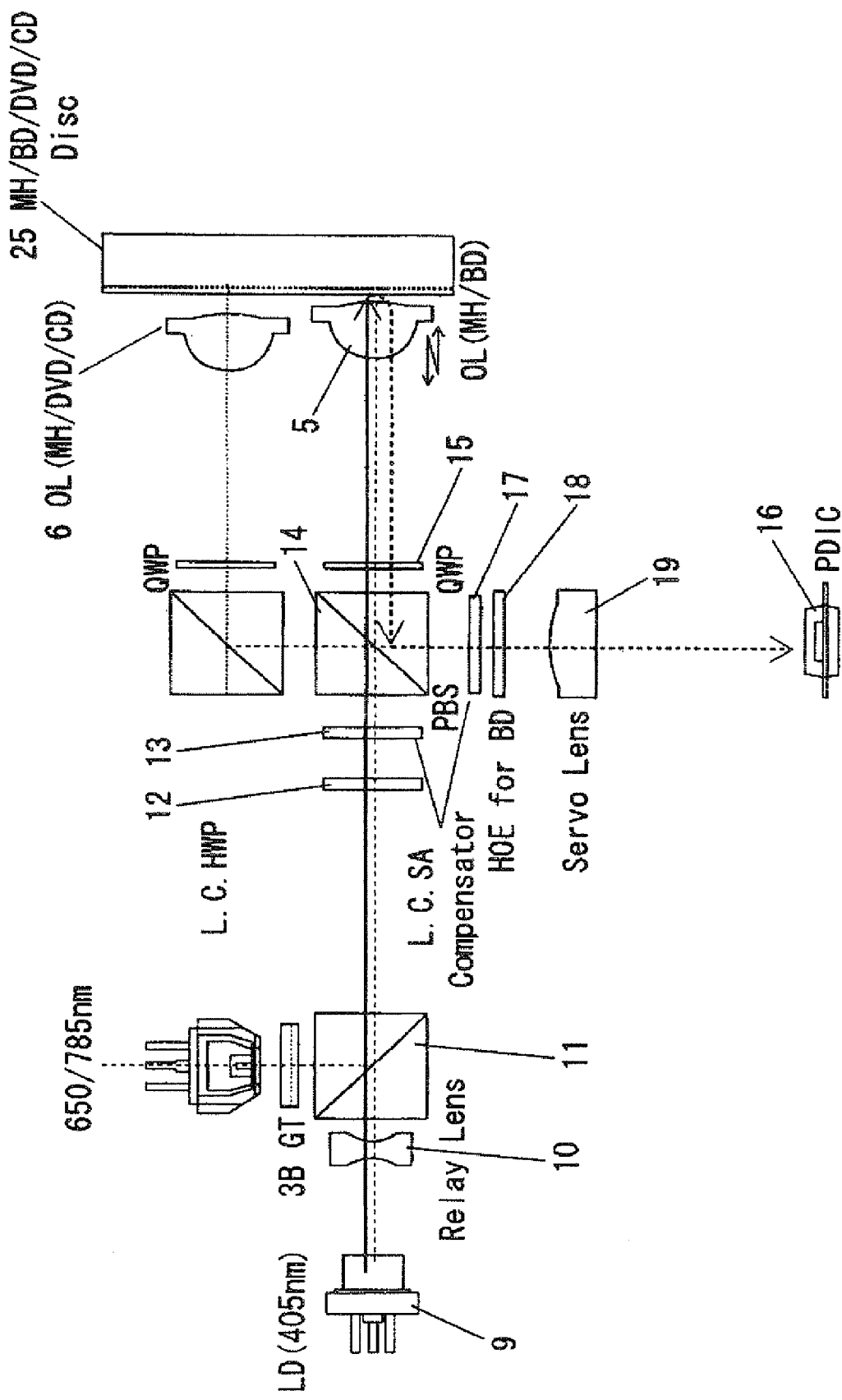
FIG. 6 is a block diagram for showing an embodiment mode of the present invention.

FIG. 6 shows such a condition that the lens 5 is utilized as a lens capable of recording and reproducing a BD 25.

In other words, in the BD 25, signals are recorded on a disk plane of the BD 25 that is located in the vicinity of the lens 5, or the signals are read out from this disk plane. As a result, the lens 5 having the large NA can be utilized.

A first description is made of a recording operation of the BD 25 with reference to FIG. 6.

Blue laser light emitted from the laser diode 9 passes through the relay lens 10, the beam splitter 11, the liquid crystal type ½-wavelength plate 12, the spherical aberration correcting element 13, the beam splitter 14, and the ¼-wavelength plate 15, and then, is irradiated via the lens 5 to a target portion of the BD 25.

At this time, since a recording operation is carried out, intensity of the blue laser light to be irradiated to the BD 25 is made higher than that when a reading operation is carried out. As a result, the recording operation is carried out with respect to the BD 25 to which the blue laser light was irradiated.

It should be noted that since no voltage is applied to the liquid crystal type ½-wavelength plate 12, the polarization direction is not changed by the ½-wavelength plate 12.

Next, a description is made of a reproducing operation with respect to the BD 25.

A broken line of FIG. 6 shows situations when a signal reproducing operation is carried out. At this time, since the intensity of the blue laser light to be irradiated to the BD 25 is decreased, as compared with that when the signal recording operation is carried out, reflection waves reflected from the BD 25 are continuously received by the light receiving element 16 so as to acquire a reproduction signal.

Since the reflection waves reflected from the BD 25 once pass through the ¼-wavelength plate 15 before the reflection waves reach the lens 5, the reflection waves again pass through the ¼-wavelength plate 15 as the reflection waves, so that the P-polarized light thereof becomes S-polarized light. As a result, the S-polarized light is reflected on the beam splitter 14. Next, the passed S-polarized light passes through the spherical aberration correcting element 17, the BD tracking-purpose element 18, and the focal point adjusting lens 19, and then, reaches the light receiving element 16 in the above-described manner.

Figure 7:
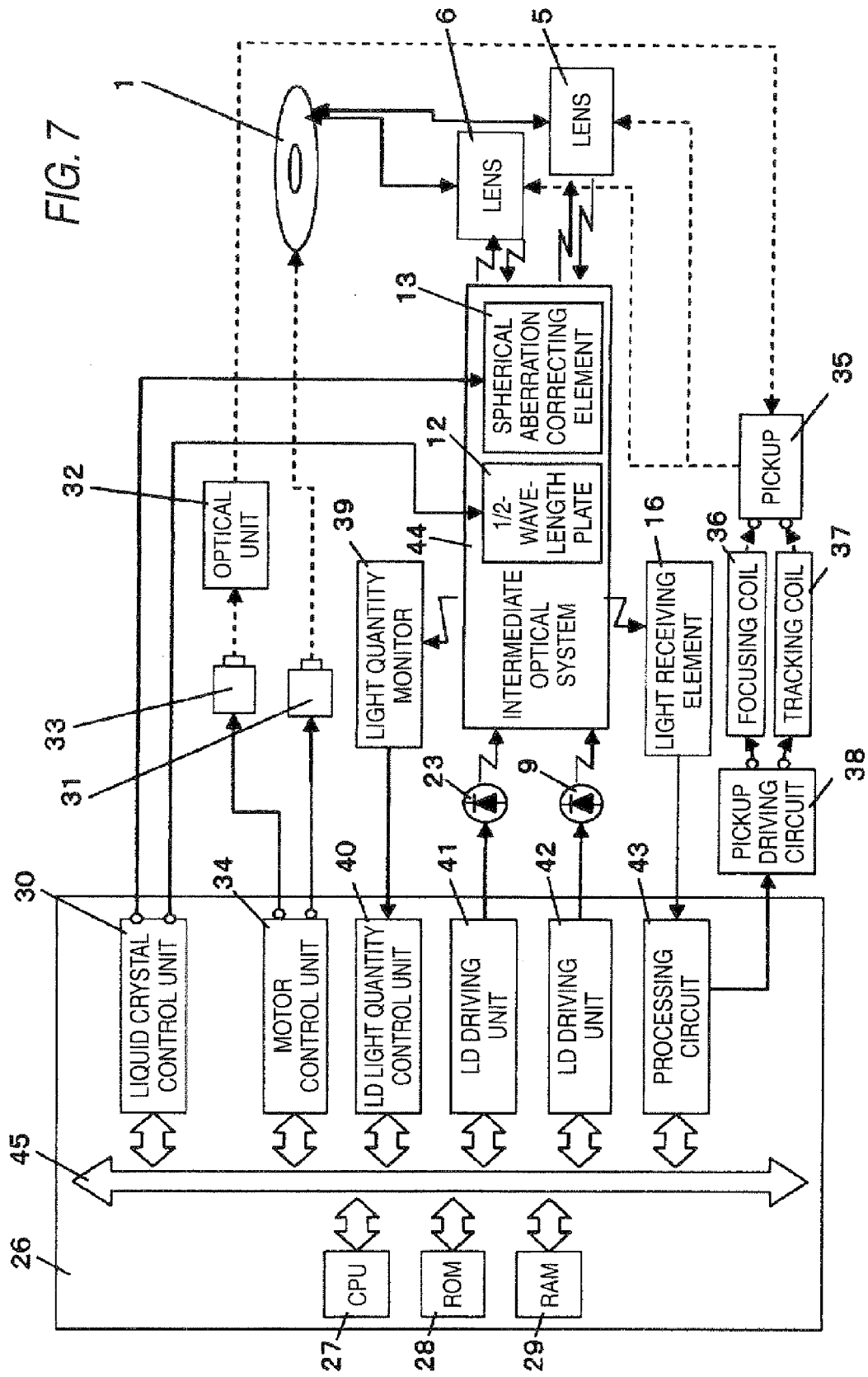
FIG. 7 is a control block diagram for indicating an embodiment mode of the present invention.

Referring now to FIG. 7, a description is made of a control system of the above-described optical disk apparatus. In FIG. 7, a CPU 27, a ROM 28, a RAM 29, a liquid crystal control unit 30, and a motor control unit 34 are provided on a board 26. The ROM 28 stores therein a control program, and the like. The RAM 29 is used as a buffer for buffering data of the micro-hologram disk 1, or the like. The liquid crystal control unit 30 controls the ½-wavelength plane 12, and the spherical aberration correcting element 13. The motor control unit 34 controls a motor 31 that rotates an optical disk such as the micro-hologram disk 1, and a motor 33 that drives an optical unit 32.

In this case, a pickup 35, a focusing coil 36, a tracking coil 37, and a pickup driving circuit 38 are provided in the optical unit 32. The pickup 35 holds thereon the lens 5 and the lens 6. The focusing coil 36 and the tracking coil 37 drive the pickup 35. The pickup driving circuit 38 controls driving operations of the focusing coil 36 and the tracking coil 37.

In addition, an LD light quantity control unit 40, LD driving units 41 and 42, and also, a processing circuit 43 are provided on the board 26. The LD light quantity control unit 40 controls the laser diodes 9 and 23 based upon a monitoring result obtained from a light quantity monitor 39. The LD driving units 41 and 42 drive the laser diodes 9 and 23. The processing circuit 43 controls the light receiving element 16 and the pickup driving circuit 38. The respective circuits provided on the board 26 are connected to each other by a bus 45.

It should also be noted that although the above-described light quantity monitor 39 is not indicated in the above-explained optical system of the present embodiment mode, the light quantity monitor 39 monitors light quantities of the laser diodes 9 and 23.

It should also be understood that an intermediate optical system 44 shown in FIG. 7 corresponds to such an optical system as represented in FIG. 1.

A description is made of operations in such a case that the micro-hologram disk 1 is recorded by operating an optical disk apparatus arranged with the above-explained control system.

For instance, in the case that signals are recorded on the micro-hologram layer 7 which is located on the side of the surface layer of the recording plane of the micro-hologram disk 1, the blue laser light emitted from the laser diode 9 is collected via the intermediate optical system 44 to target micro-holograms 4 by the lens 5, so that the signal recording operation is carried out based upon data stored in the RAM 29.

At this time, the liquid crystal control unit 30 operates the spherical aberration correcting element 13 in order to correct the spherical aberration, and also drives the focusing coil 36 and the tracking coil 37, so that the blue laser light emitted from the laser diode 9 may be firmly collected to the target micro-holograms 4.

Further, since light quantities of the laser diode 9 are monitored by the light quantity monitor 39, the LD driving unit 42 is controlled by the LD light quantity control unit 40 in such a manner that the monitored light quantity may become a proper light quantity.

It should also be understood that when signals are recorded on the micro-hologram layer 8 which is located on the side of the inner layer of the micro-hologram disk 1, while the ½-wavelength plate 12 is brought into the ON state, the blue laser light passes through such an optical path as represented in FIG. 3, which is different from the optical path shown in FIG. 1, so that the signals are recorded on the micro-hologram layer 8 by the lens 6.

While the recording operation for the micro-hologram disk 1 has been described in the above exemplification, a reproducing operation for the micro-hologram disk 1 is carried out in a similar manner, namely, reflection light reflected from the micro-hologram layer 7, or 8 is received by the light receiving element 16, and thus, the reflection light received by the light receiving element 16 is read out as data by operating the processing circuit 43 under control of the CPU 27.

Also, as to recording/reproducing operations with respect to a BD, a DVD, and a CD, the optical disk apparatus is operated by employing the above-described control system in similar manners to the conventional manners.

It should also be understood that the above-described lens 5 employed in the present embodiment mode corresponds to a BD-purpose lens, and the BD-purpose lens 5 having NA=0.85 was employed. Further, the above-explained lens 6 corresponds to a CD/DVD-purpose lens, while such a CD/DVD-purpose lens has two sorts of numerical apertures (NAs), namely, NA=0.65 (used for DVD) and NA=0.52 (used for CD). In such a case that the recording and reproducing operations are carried out with respect to the above-described micro-hologram disk 1, the lens 6 was employed as the lens having NA=0.52, namely the CD-purpose lens.

It should also be noted that when the recording/reproducing operations are carried out with respect to the micro-hologram disk 1, although the lens 6 was used as such a CD-purpose lens having NA=0.52, the lens 6 may be alternatively used as a DVD-purpose lens having NA=0.65.

As previously described, the present invention is featured as follows: That is, while micro-hologram layers constructed by employing a plurality of layers are formed in an inner portion of a plate body of a micro-hologram disk along a thickness direction of the above-described plate body, dimensions of micro-holograms along the thickness direction of the plate body, which configure a micro-hologram layer formed on the side of one surface of the plate body within the micro-hologram layers constructed of the plural layers, are made smaller than dimensions of micro-holograms along the thickness direction of the plate body, which configure a micro-hologram layer formed on the side of an inner layer of the plate body. As a result, a recording capacity of the micro-hologram disk can be increased.

In other words, in accordance with the present invention, the dimensions of the micro-holograms along the thickness direction of the plate body, which configure one micro-hologram layer formed on the side of one surface of the plate body within the micro-hologram layers constructed of the plural layers, are made smaller than the dimensions of the micro-holograms along the thickness direction of the plate body, which configure another micro-hologram layer formed on the side of an inner layer of the plate body. As a consequence, a larger number of the micro-hologram layers can be formed along the thickness direction of the plate body. As a result, the recording capacity of the micro-hologram disk can be increased.

Accordingly, the micro-hologram disk can be expected to be widely utilized as recording media for various sorts of optical disk apparatus.

This application claims the benefit of Japanese Patent application No. 2008-266002 filed on Oct. 15, 2008, the entire contents of which are incorporated herein by reference.

What is claimed is:

1. An optical disk, comprising:
   a plate body; and
   a plurality of micro-hologram layers formed in an inner portion of the plate body along a thickness direction of the plate body,
   wherein dimensions along the thickness direction of the plate body of micro-holograms which configure a micro-hologram layer formed on a side of one surface of the plate body among the plurality of micro-hologram layers, are made smaller than dimensions along the thickness direction of the plate body of micro-holograms which configure a micro-hologram layer formed on a side of an inner layer of the plate body.

2. The optical disk as claimed in claim 1, wherein dimensions of the micro-holograms along a direction perpendicular to the thickness direction of the plate body, which configure the micro-hologram layer formed on the side of the one surface of the plate body, are made smaller than dimensions of the micro-holograms along the direction perpendicular to the thickness direction, which configures the micro-hologram layer formed on the side of the inner layer of the plate body.

3. The optical disk as claimed in claim 1, wherein: a thickness of the micro-hologram layer formed on the side of the one surface of the plate body along the plate thickness direction is made thinner than a thickness of the micro-hologram layer formed on the side of the inner layer thereof along the plate thickness direction.

4. The optical disk as claimed in claim 1, wherein: the dimensions as to the plurality of micro-holograms which configure the micro-hologram layer formed on the side of the one surface of the plate body are substantially equal to each other.

5. The optical disk as claimed in claim 1, wherein: the dimensions as to the plurality of micro-holograms which configures the micro-hologram layer formed on the side of the inner layer are substantially equal to each other.

6. The optical disk as claimed in claim 1 wherein: the one surface side of the plate body corresponds to a recording plane side of the plate body.

7. An optical disk apparatus, comprising:
   a light source irradiating light to a hologram disk;

a first lens collecting the light emitted from the light source to a hologram layer formed on the side of a recording plane of the hologram disk; and a second lens collecting the light emitted from the light source to a hologram layer formed on the side of an inner layer of the hologram disk, wherein:

an NA (numerical aperture) of the first lens is made larger than an NA of the second lens.

8. The optical disk apparatus as claimed in claim 7 wherein: the first lens is commonly used as a lens for recording a BD (Blu-ray disk), and a lens for reproducing the BD.

9. The optical disk apparatus as claimed in claim 7, wherein: the second lens is commonly used as a lens for recording and reproducing at least one of a DVD (digital versatile disk) and a CD (compact disk).

10. The optical disk apparatus as claimed in claim 9 wherein: when either a recording operation or a reproducing operation is carried out with respect to the hologram layer formed on the side of the inner layer of the hologram disk, the NA of the second lens is equal to the NA thereof when a recording operation for the CD is carried out.

11. The optical disk apparatus as claimed in claim 7, further comprising: a light source recording or reproducing at least one of the DVD and CD; wherein the light source is utilized as a light source for the BD.

12. A recording/reproducing method of an optical disk which includes a date body and a plurality of micro-hologram layers formed in an inner portion of the plate body along a thickness direction of the plate body, wherein dimensions along the thickness direction of the plate body of micro-holograms which configure a micro-hologram layer formed on a side of one surface of the plate body among the plurality, of micro-hologram layers, are made smaller than dimensions along the thickness direction of the plate body of micro-holograms which configure a micro-hologram layer formed on a side of an inner layer of the plate body, the method comprising:

irradiating light to the optical disk;

collecting, by a first lens, the light emitted from the light source to form the micro-holograms which configure the micro-hologram layer formed on the side of the one surface of the plate body; and collecting, by a second lens, the light emitted from the light source to form the micro-holograms which configure the micro-hologram layer formed on the side of the inner layer of the plate body, wherein:

an NA of the first lens is made larger than an NA of the second lens.

* * * * *